United States Patent
Modde et al.

(10) Patent No.: US 11,915,612 B2
(45) Date of Patent: Feb. 27, 2024

(54) MULTI-SENSORY LEARNING WITH FEEDBACK

(71) Applicant: Originator Inc., San Francisco, CA (US)

(72) Inventors: Emily Modde, San Francisco, CA (US); Joshua Ruthnick, San Francisco, CA (US); Joseph Ghazal, San Carlos, CA (US); Rex Ishibashi, San Francisco, CA (US)

(73) Assignee: Originator Inc., San Francisco, CA (US)

( * ) Notice: Subject to any disclaimer, the term of this patent is extended or adjusted under 35 U.S.C. 154(b) by 0 days.

(21) Appl. No.: 17/334,927

(22) Filed: May 31, 2021

(65) Prior Publication Data

US 2021/0358319 A1 Nov. 18, 2021

Related U.S. Application Data

(63) Continuation of application No. 14/157,808, filed on Jan. 17, 2014, now abandoned.

(51) Int. Cl.
*G09B 5/06* (2006.01)

(52) U.S. Cl.
CPC ........................ *G09B 5/06* (2013.01)

(58) Field of Classification Search
CPC .......................................................... G09B 5/06
See application file for complete search history.

(56) References Cited

U.S. PATENT DOCUMENTS

| 4,884,972 | A | * | 12/1989 | Gasper | G09B 5/065 434/167 |
|---|---|---|---|---|---|
| 11,361,760 | B2 | | 6/2022 | Blau-McCandliss et al. | |
| 2005/0196732 | A1 | * | 9/2005 | Budra | G09B 7/00 434/362 |
| 2005/0260547 | A1 | * | 11/2005 | Moody | G09B 17/00 434/176 |
| 2007/0224578 | A1 | * | 9/2007 | De Ley | G09B 19/04 434/169 |
| 2007/0288411 | A1 | * | 12/2007 | Jenkins | G09B 5/02 706/45 |
| 2007/0298384 | A1 | * | 12/2007 | Jenkins | G09B 7/02 434/156 |
| 2007/0298385 | A1 | * | 12/2007 | Jenkins | G09B 19/06 434/156 |
| 2009/0047641 | A1 | * | 2/2009 | Hayes | G09B 17/00 434/159 |
| 2010/0009321 | A1 | * | 1/2010 | Purushotma | G09B 19/06 434/157 |

(Continued)

FOREIGN PATENT DOCUMENTS

WO 2013116017 A1 8/2013

*Primary Examiner* — Eddy Saint-Vil
(74) *Attorney, Agent, or Firm* — Aird & McBurney LP

(57) ABSTRACT

The disclosed embodiments relate to improved learning methods and systems incorporating multisensory feedback. In some embodiments, virtual puzzle pieces represented by letters, numbers, or words, may animate in conjunction with phonetic sounds (e.g., as to letters or letter combinations) and pronunciation readings (e.g., as to words and numbers) when selected by a user. The animations and audio soundings may be coordinated to better inculcate the correspondence between graphical icons and corresponding vocalizations in the user.

24 Claims, 12 Drawing Sheets

(56) References Cited

U.S. PATENT DOCUMENTS

2013/0149680 A1* 6/2013 Nava .................... G09B 5/06
434/157
2013/0244217 A1* 9/2013 Potts .................... G09B 5/02
434/324
2014/0315179 A1* 10/2014 DeGross ............... G09B 7/06
434/362

* cited by examiner

MULTI-SENSORY LEARNING WITH FEEDBACK

CROSS REFERENCE TO RELATED APPLICATION

This application is a continuation of U.S. patent application Ser. No. 14/157,808, filed Jan. 17, 2014, which is incorporated by reference herein in its entirety.

FIELD

Various of the disclosed embodiments concern systems and methods for providing multi-sensory, e.g., both audible and visual, feedback during a learning experience.

BACKGROUND

With the mass-market proliferation of digital media technologies accessed from desktop and mobile devices, a growing number of learning and game applications have been published which attempt to develop or test a player's knowledge. Many such applications have focused on animated storytelling, rich multimedia graphics, user-driven learning paths, and deep libraries of content that would otherwise be unwieldy in book or other physical form. Specifically, many of these applications teach based upon (i) a non-interactive presentation of multimedia information or (ii) a success or failure result conveyed after a user takes an action.

While these applications can be somewhat informative and entertaining, they lack the immediacy, excitement, and understanding conveyed by real-time, multi-sensory feedback while engaged in play. Furthermore, learners of a certain age respond differently to various forms of feedback as compared to other portions of the population. Accordingly, there exists a need for a multi-sensory learning approach which synthesizes various feedback mechanisms in manners particularly effective for selected groups of users.

BRIEF DESCRIPTION OF THE DRAWINGS

One or more embodiments of the present disclosure are illustrated by way of example and not limitation in the figures of the accompanying drawings, in which like references indicate similar elements.

FIG. 13 shows a diagrammatic representation of a machine in the example form of a computer system within which a set of instructions for causing the machine to perform one or more of the methodologies discussed herein may be executed.

Those skilled in the art will appreciate that the logic and process steps illustrated in the various flow diagrams discussed below may be altered in a variety of ways. For example, the order of the logic may be rearranged, substeps may be performed in parallel, illustrated logic may be omitted, other logic may be included, etc. One will recognize that certain steps may be consolidated into a single step and that actions represented by a single step may be alternatively represented as a collection of substeps. The figures are designed to make the disclosed concepts more comprehensible to a human reader. Those skilled in the art will appreciate that actual data structures used to store this information may differ from the figures and/or tables shown, in that they, for example, may be organized in a different manner; may contain more or less information than shown; may be compressed, scrambled and/or encrypted; etc.

DETAILED DESCRIPTION

Various embodiments of the present disclosure include systems and methods for multi-sensory feedback during a learning application. In some embodiments, virtual puzzle pieces represented by letters, numbers, or words, may actively animate and make phonetic sounds (e.g., as to letters or letter combinations) and pronunciation readings (e.g., as to words and numbers) while being selected on the display of a user device.

Various examples of the invention will now be described. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below, to avoid unnecessarily obscuring the relevant descriptions of the various examples.

Figure 1:
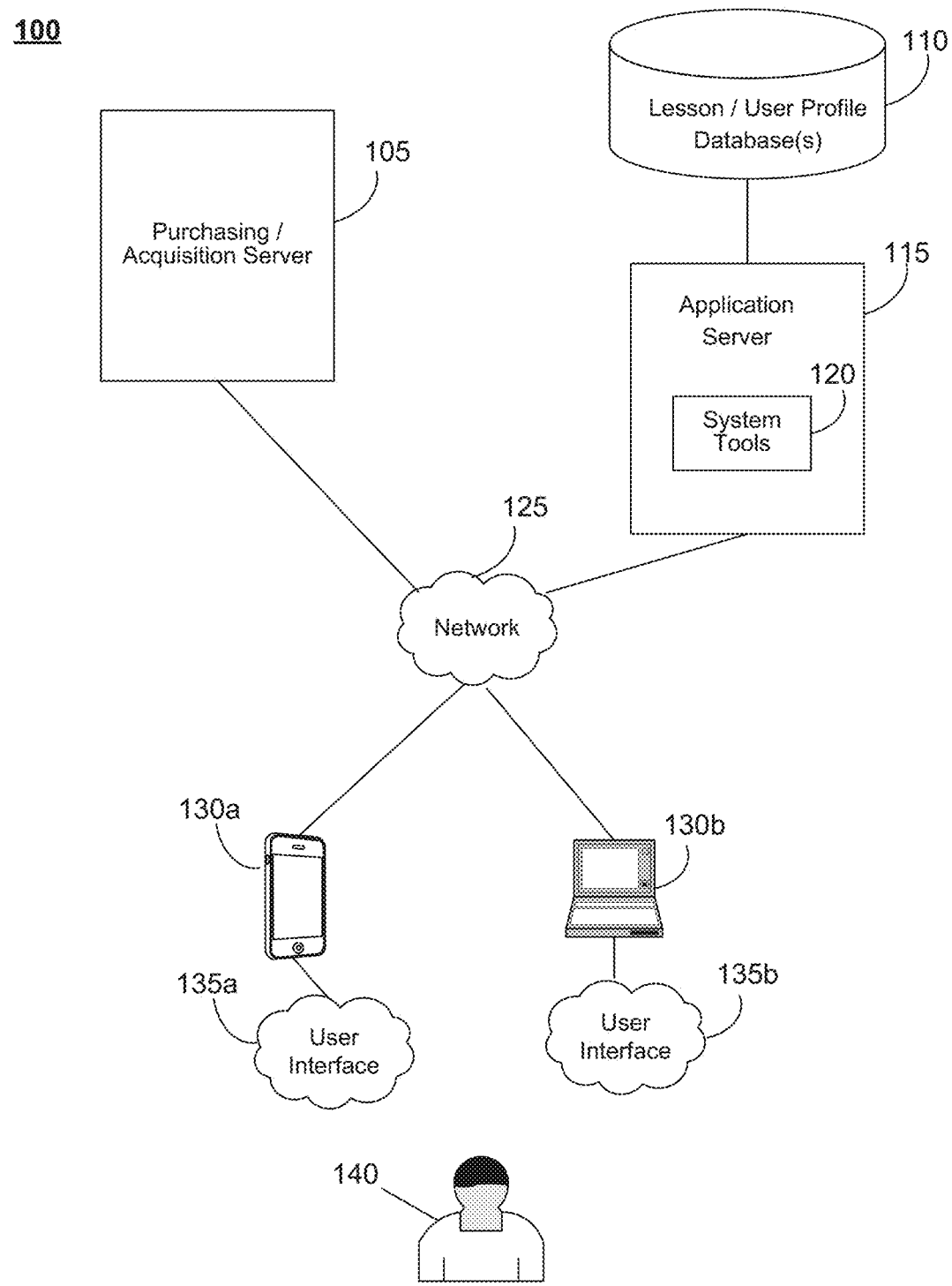
FIG. 1 is a block diagram overview of an example system topology as may be implemented in some embodiments for delivering and/or running an application on a user device.

The terminology used below is to be interpreted in its broadest reasonable manner, even though it is being used in conjunction with a detailed description of certain specific examples of the invention. Indeed, certain terms may even be emphasized below; however, any terminology intended to be interpreted in any restricted manner will be overtly and specifically defined as such in this Detailed Description section System Topology Overview for Delivering/Running Applications FIG. 1 is a block diagram overview of an example system topology 100 as may be implemented in some embodiments for delivering and/or running an application on a user device. In this example topology 100 a purchasing server 105 stores copies of the application for purchase or free download (e.g., a server supporting a software store). A user 140 (or, e.g., a guardian of the user) may purchase or otherwise request a copy of the software for download and installation on one or more of user devices 130a-b. User devices 130a-b may include any computational device suitable for presenting audio and video and receiving input under the disclosed embodiments, e.g., a desktop computer, a laptop computer, a personal digital assistant, an iPad®, an iPhone®, an Android® phone, a television peripheral, a home entertainment system such as an XBox®, Sony PlayStation®, an in-vehicle entertainment system, a custom designed device, a children's digital toy, etc. User interfaces 135a-b may include any suitable input, audio and display devices, including, e.g., keyboards, computer mouse, touchscreen displays, computer monitors, integrated vehicle monitors, dashboard controls, entertainment system controllers (e.g., Box® or Sony PlayStation® controllers), joysticks, integrated speaker systems, external speakers, earphones, etc. In some embodiments, the application may be downloaded from server 105 across network 125 which may be, e.g., the Internet.

In some embodiments, the application may instead be preinstalled on the user devices 130a-b or installed via disc, e.g., a CD-ROM. In some embodiments, the application, while running on one or more user devices 130a-b, may communicate with the purchasing server 105 or with a dedicated application server 115. The purchasing server 105 or the dedicated application server 115 may be able to provide live updates to the application software and to provide information stored offsite, e.g., in a database 110. For example, user profiles and lesson plan information may be stored offsite and remotely updated to the application on user devices 130a-b. System tools 120 may include processing hardware and software configured to supplement the local functionality of the application (e.g., speech processing, data analysis, machine learning, etc.). Target words and sentences, described in greater detail below, and their corresponding animations may be generated over time and dynamically updated to the user device (e.g., automatically or following an additional user purchase). Thus, new characters and content may be provided to the application beyond its original configuration.

Word Games

In some embodiments, virtual puzzle pieces represented by letters, numbers, or words, may actively animate and make phonetic sounds (e.g., as to letters or letter combinations) and pronunciation readings (e.g., as to words and numbers) while being selected on the displays of user devices 130a-b. Selection may occur, for example, by a curser controlled by a computer mouse or a finger on touch-based devices. Multi-sensory audio and animation feedback may be presented during tactile interaction in some embodiments, e.g., to illustrate and reinforce various concepts. In some embodiments, the system coordinates the multi-sensory feedback with the user action to improve the learning experience by solidifying various correspondences (e.g., letter soundings and visual letter depictions).

In some embodiments, touching or selecting puzzle pieces (e.g., graphics of letters) as they are used, but before the completion of a puzzle, may result in a simultaneous audio sounding of the corresponding partial result, e.g., a sounding of the partially completed letters in a word. An animation for the piece may likewise be activated to further demonstrate the correspondence between the audio and the particular piece. For example, "eyes" and a "mouth" may be overlaid upon the piece and the piece made to gesticulate in time with the audio. This may give the effect of the piece being a "living creature" which may help reinforce learning by calling attention to the object and developing an affiliation between the object and the user. The piece may be susceptible to the selection, e.g., moving according to physics model based upon the user's motions (e.g., dragging the piece quickly may result in a spring-like expansion of the piece, followed by a compression at an abrupt stop of the user's hand). These features can serve to impart a "physical existence" to the piece, impressing upon the user that the corresponding abstractions (e.g., the phonetic pronunciation) have real-world meanings.

The audio portion may indicate the partial result of the combination of letters, words or numbers. For example, where the target word is "lick" and the user selects an "L" piece, the "L" piece may animate in time with an audio sounding of the "Li" subcomponent of "lick" (e.g., a short vowel sounding, similar to the occurrence in "lip"). In contrast, if the target word is "like" the same letter "L" piece may instead animate in time with an audio for the "Li" but as a subcomponent of "like" (e.g., a long vowel sounding, similar to the occurrence in "lye"). When the piece is inserted into the corresponding puzzle location the animation and audio may cease in some embodiments. In some embodiments, a default "L" sound, (e.g., "lah") may sound without reference to the subsequent vowels (e.g., regardless of whether the word uses a short or long vowel). An internal mapping structure (e.g., an XML, SQL, or JSON database) may be used to indicate whether a long, short, or other variation of a consonant or vowel's voicing will be used. Such real-time feedback on only a partially completed learning puzzle helps to teach the components of the puzzle that have been completed and, through exclusion, the part of the puzzle (be it a letter, number or word) that has not been completed. In some embodiments, groups of letters, rather an individual letters, may be broken up together. The user may then place the group of letters together into the word (e.g., "ch" in "chocolate") rather than the individual, constituent letters ("c" and "h") of the group. A corresponding puzzle slot for the group may exist in the word.

Figure 2:
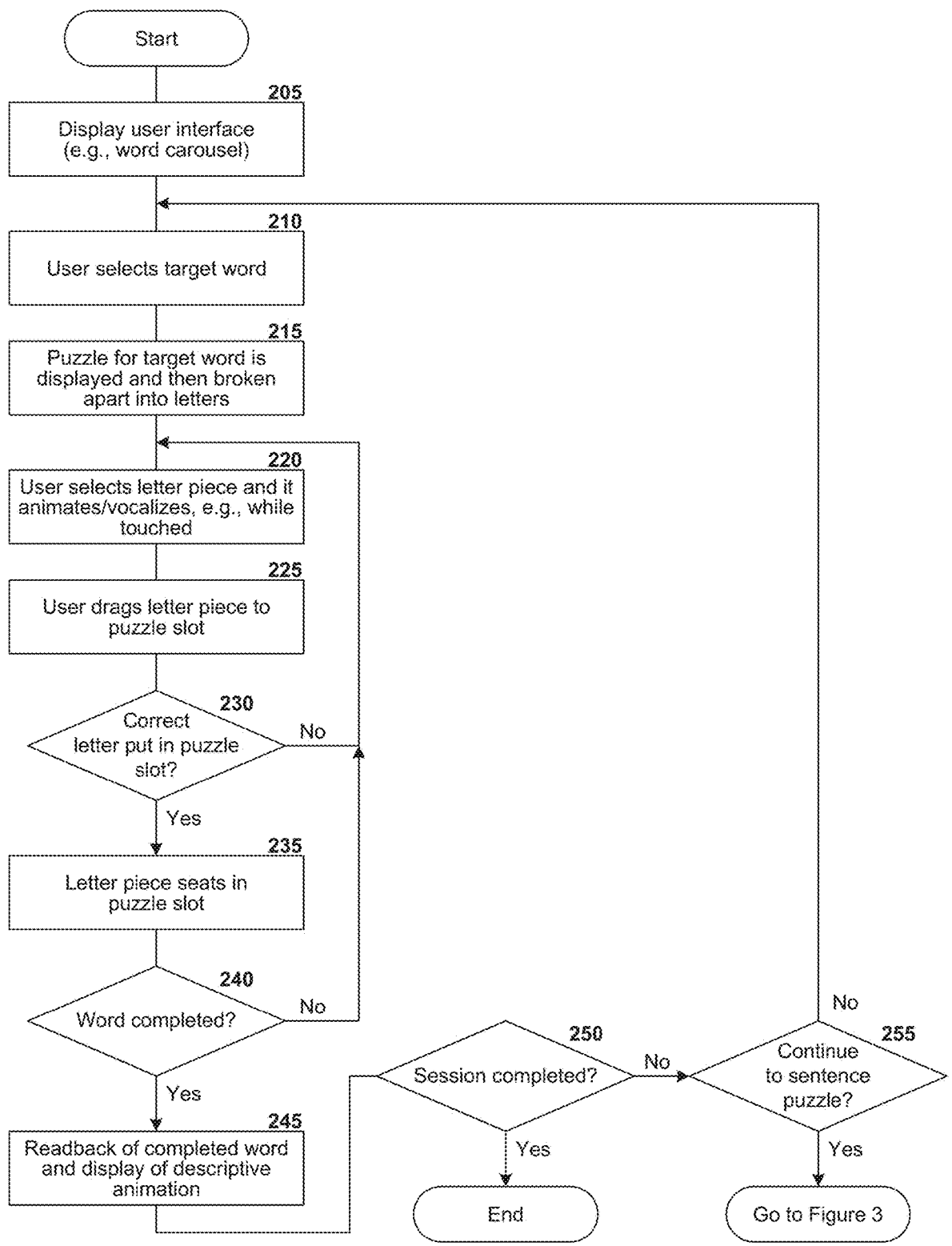
FIG. 2 is a flow chart of an example process for user interaction with a word puzzle application providing real-time interactive feedback to the user as may occur in some embodiments.

FIG. 2 is a flow chart of an example process 200 for user interaction with a word puzzle application providing real-time interactive feedback to the user as may occur in some embodiments. In this example, interaction flow is generally in real-time and multi-sensory feedback is employed when a letter piece is selected (e.g., via active touch or through a cursor controlled by a computer mouse) and moved. E.g., in a touch display, selection may include the initial touching of the letter. During selection, and e.g., subsequent dragging, the letter piece may persistently animate and the phonetic sounding may be played. When all letters have been appropriately placed for the word, the overall word may animate and its full reading may be played. The overall animation may be a "celebratory" animation as described in greater detail herein.

Figure 4:
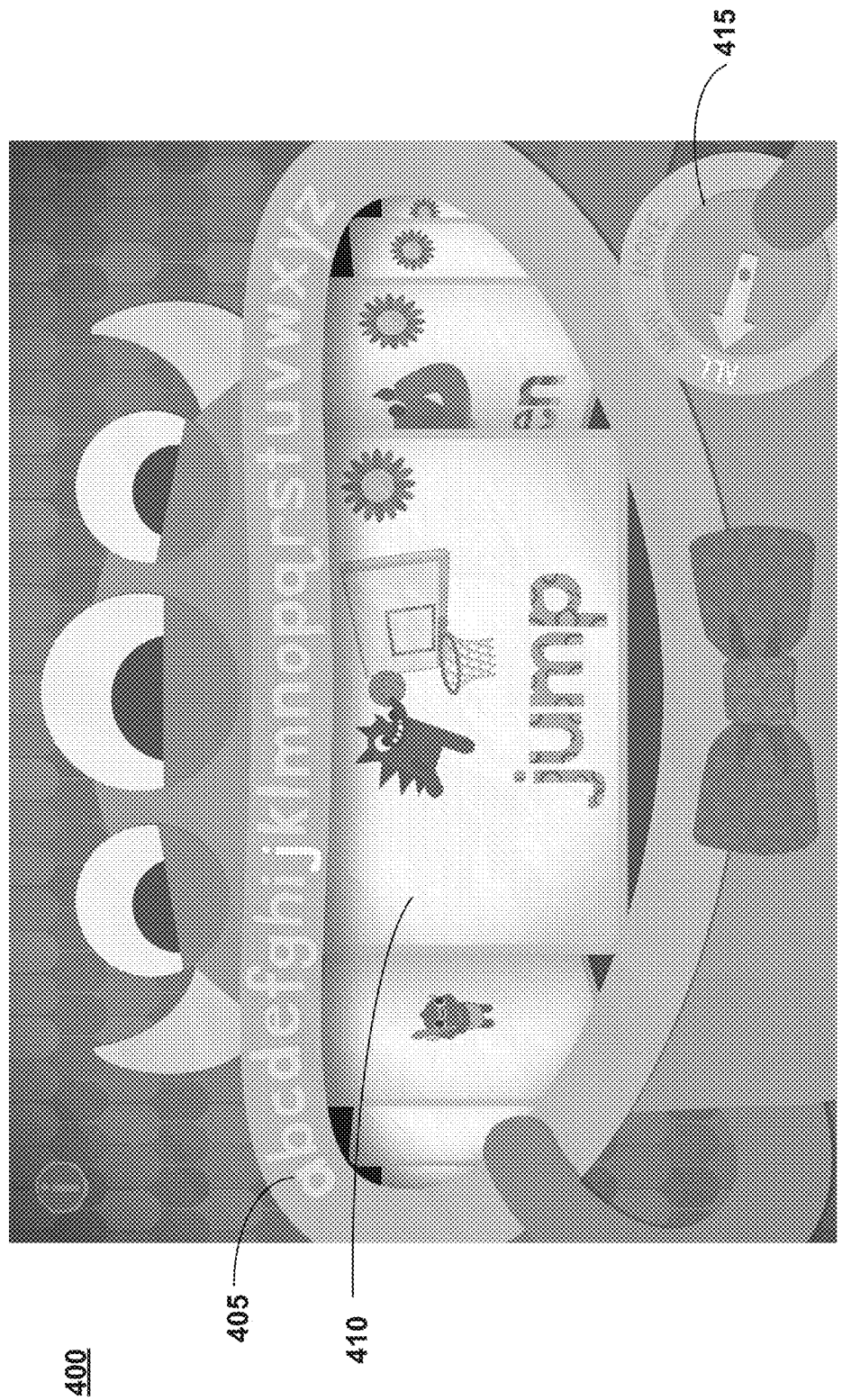
FIG. 4 is a screenshot of an example letter and word screen navigation from which a user selects a target word as may occur in some embodiments.

At block 205, the system displays a user interface to the user (e.g., a carousel as in FIG. 4). At block 210, the user selects a word from the carousel (e.g., after first selecting a letter to display a plurality of possible words including the selected letter). At block 215, the system may display the puzzle for the word, which is broken into its constituent letters (e.g., various affine transforms, or simply rotations and translations, may be applied to each letter). At block 220, the user selects a letter piece which may be animated and/or vocalized by the application while selected. At block 225, the user may drag the piece to a puzzle slot, e.g., the correct location for the piece where the word is being constructed. At block 230, the system may determine whether the letter is placed in the correct puzzle slot. If the letter is not correctly placed, the system may return to block 220 for the next selection. A "failure" animation and/or audio segment may be presented to the user following an incomplete or incorrect placement of the letter. The "failure" animation may be of the letter and/or of the entire word and may include animal-like groans or sighs, musical tones, etc. The letter and words may accordingly be overlaid with eyes and or mouth images to encourage an animal-like correspondence. These overlays may only occur following a selection so that the graphical character of the letter as it appears in the everyday world will also be clear.

If the letter was correctly placed, at block 235, the letter piece may be "seated" in the puzzle slot (e.g., rotated and translated into the proper location in the word). A "partial success" animation and audio for the letter/word may be presented to the user if the word is not yet complete (e.g., pronunciation of a sub-portion of the word including the successfully placed letters). At block 240, the system may determine whether the letter placement results in a completed word, returning to block 220 if not. Correct placement of a letter may prevent subsequent movement of the letter by the user. While the letter may not subsequently move, in some embodiments, selection by the user may still result in an animation and an audio segment being played to reinforce the letter's sounding even after its correct placement. If the word is complete (e.g., all letter pieces have been correctly placed) at block 245, then the system may present a "readback" audio segment reciting the entire word, in some embodiments with definition, and display a descriptive animation. For example, the descriptive animation may include the word assuming the character of a live animal and then performing the recited action (e.g., licking an object for the target word "lick", running in circles for the target word "run", etc.).

At block 250, the system may determine that the session is complete. For example, new users or younger users may be presented with information in smaller segments. Accordingly, completion of the word game may return the user to the navigation screen. In contrast, for veteran users or older users the system may continue the session and present additional information. In this example, the system may determine at block 255 whether to pursue a sentence puzzle incorporating the word. For example, the system may consult the user to determine if they wish to continue, or consult a lesson plan indicating correspondences between words and sentences.

Sentence Games

Figure 3:
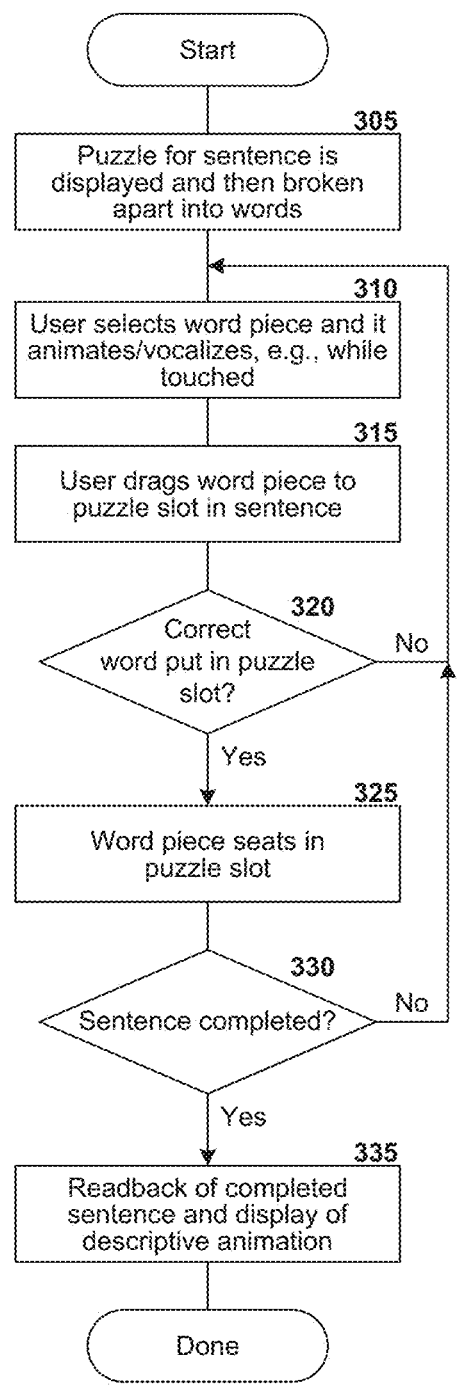
FIG. 3 is a flow chart of an example process for user interaction with a sentence puzzle application providing real-time interactive feedback to the user as may occur in some embodiments.

FIG. 3 is a flow chart of an example process 300 for user interaction with a sentence puzzle application providing real-time interactive feedback to the user as may occur in some embodiments. As with the "word" example of FIG. 2, the "sentence" example of FIG. 3 may incorporate real-time, multi-sensory feedback into the interactive flow when a word piece is selected (e.g., via active touch or through a cursor controlled by a computer mouse). During selection, word pieces may persistently animate and the pronounced word reading may be played. When the user has placed the words into their corresponding positions in the sentence, the overall sentence may animate and its full reading may be played.

At block 305, the sentence may be displayed and broken apart into words. For example, as in the "word" example, a stampede of animated characters (e.g., monsters 505) may disassociate all or a portion of the words, translating and/or rotating them from their correct positions in the sentence. At block 310, the user may select a word piece which may be animated and accompanied with a vocalization in a manner similar to the letters described with respect to FIG. 2. At block 315, the user may attempt to drag the word piece to a puzzle slot (e.g., a correct location in the sentence). At block 320, the system may determine whether the correct word was placed (e.g., the first moment of its graphic being within a threshold distance of the center of the correct location) in the correct puzzle slot. "Placement" may mean, e.g., releasing contact with a touch-screen display, or releasing a mouse button, after dragging the letter to a new position. If the word is not correctly placed the system may return to block 310. If the word was correctly placed, then at block 325, the system may seat the word piece into the puzzle slot (e.g., preventing further movement as with the correctly placed letter described above, but still permitting subsequent selections to produce an animation and audio). If the sentence is not yet completed, then the system may return to block 310 from block 330. If the sentence is determined to be completed at block 330, then at block 335 the system may generate a "readback" audio of the sentence and display a celebratory and/or descriptive animation. For example, if the sentence was "Jack makes funny faces in a mirror" an animation of Jack performing such faces in a mirror may be displayed.

FIG. 2 and FIG. 3 show specific embodiments in the form of component letters and words forming, respectively, word or sentence puzzles, but various embodiments extend beyond these examples. Some embodiments use real-time, multi-sensory feedback to teach the recognition of numerical digits, numbers, binary operators (e.g. "+", "−", etc.), and mathematical equations. Some embodiments employ non-directed, free-play interaction where real-time, multi-sensory feedback is provided when a user selects any letter or number to create any word or larger number that the user chooses. Such embodiments may even result in "words" that are not part of everyday use or which exist at all. Another alternative embodiment is in a real-time, multi-sensory feedback to teach the recognition of symbols, images, designs, emblems, and other visual designators. For example, some systems may use alternative alphabets, such as the Hebrew alphabet, or various Asian characters (Hiragana, Katakana, Kanji, etc.) to teach a non-native speaker to vocalize the different letters, resulting words and sentences, thus aiding in language training for all ages.

Similarly, some embodiments permit the user to select a language and/or to select a skill level (e.g., shorter v. longer words/sentences). Some embodiments may allow the user to provide feedback that can include gaining points (e.g. in-game currency, or points with real-world value). Some embodiments include feedback that may include network relations, e.g. ties to social networking. For example, successful completion of a puzzle or a collection of puzzles may result in a celebratory status update sent to the Facebook® account of a parent, sibling, teacher, etc. Users may competitively solve puzzles with their peers and their relative "points" or in-game currency may be shared between them via social network status updates.

Some embodiments apply the multisensory approach to more difficult concepts in the sciences. For example, some embodiments may apply to biology concepts, such as botany. The user may drag parts of a flower (e.g., stamen or pistil) to an outline of an entire flower, or anatomy features of a cell or animal to an outline of the entire cell or animal. The individual components may be attributed life-like characters and the accompanying audio may name the individual components rather than produce a phonetic vocalization as in the letter example discussed herein. Having the component parts of a biological, technical, scientific, engineering, etc. system pronounced using the multisensory approach can help a user to better recall the proper pronunciation at a later date. In some embodiments, the component may be displayed as a graphic image of the component prior to its selection. Once selected, the component may transition to a graphic of its spelling, to further inculcate the correspondence in the user between the component, spelling, and pronunciation. The static and selected states may likewise be reversed for some of the embodiments discussed herein. For example, a single component may be animated and voiced using the multisensory approach prior to selection. Upon selection, or upon correct placement, the animation and/or audio may cease. This approach may be used to first train the user. The order in which components/characters are animated may be based on the subject matter being taught.

Example Screenshots

FIGS. 4-11 show specific screenshots from an example application. FIG. 4 is a screenshot of an example letter and word screen navigation 400 from which a user selects a target word as may occur in some embodiments. In some embodiments the screenshot of FIG. 4 may be the primary navigational user-interface for a touch-based application. In some embodiments, after selecting a letter via list 405, the word carousel may present a plurality of target words 410 for selection (e.g., words sharing that same first letter). In some embodiments, the letters of list 405 may not be selectable but may instead be highlighted based upon the first letter of the target word selected (in this manner indicating where in the alphabet the currently selected target word is located). In this example, the word "jump" is the target word and may be touched on-screen by the user to start the interaction flow. The navigational user-interface can be in various forms including the random selection of a target word, etc. In some embodiments, rather than numbers, symbols, images, etc. rather than words may be instead presented. A control interface 415 may be used to select all or a subset of the words for consideration (e.g., as part of a lesson plan).

Figure 5:
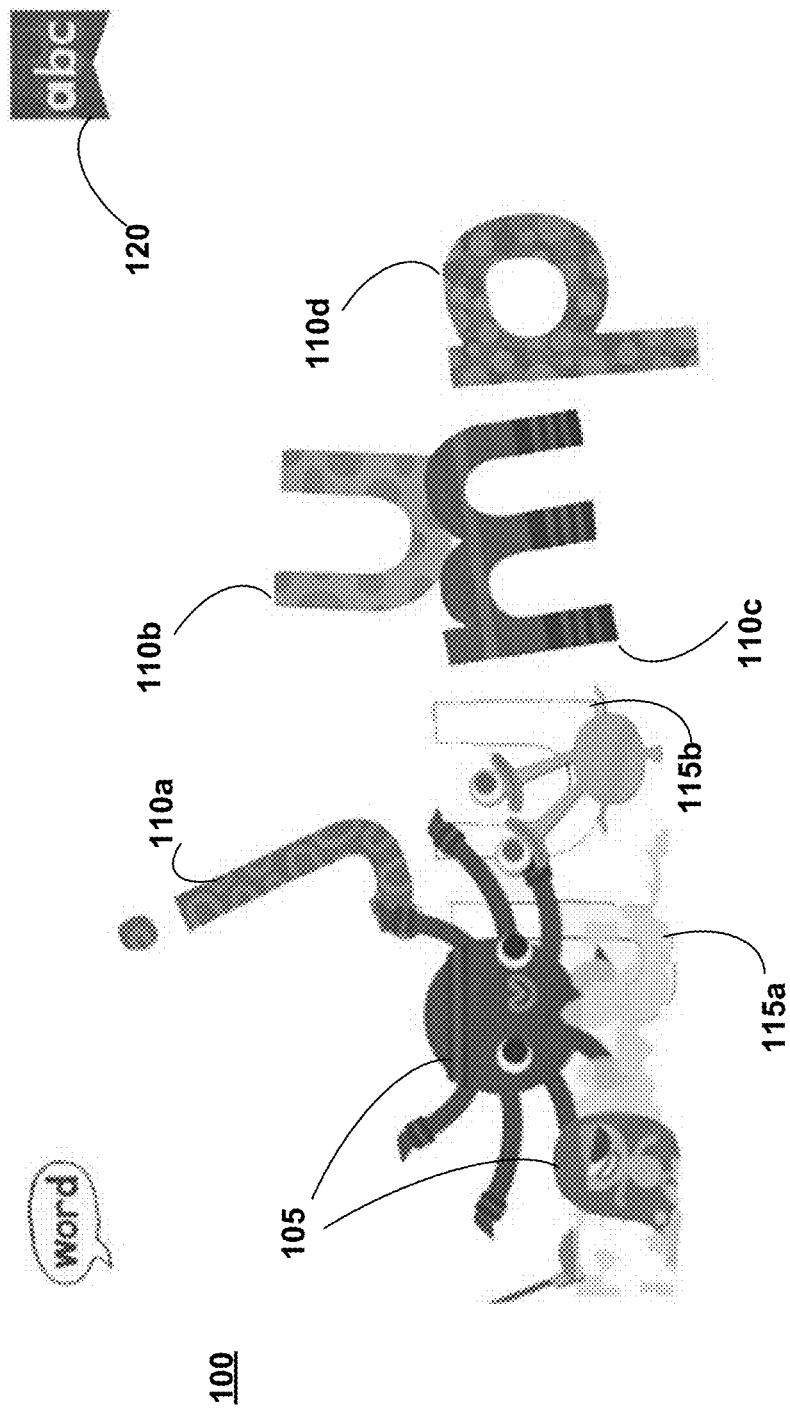
FIG. 5 is a screenshot of an example "breaking up" action for a selected word (e.g. "jump" in this case) into a puzzle of component letters as may be implemented in some embodiments.

FIG. 5 is a screenshot of an example "breaking up" action (in this example monsters 505 stampeding across the image) for a selected word (e.g. "jump" in this case) into a puzzle of component letters 510*a-d* as may be implemented in some embodiments. In this example, the "breaking up" action follows a brief image of the completed word puzzle to reinforce the objective of the puzzle. In an alternative embodiment, a specific objective may not be explicitly defined for the user and may, in fact, involve free-play where a user plays without a system-defined objective. Puzzle slots 515*a-b* may be indicated by outlines for the correct letter. Selecting icon 520 may return the user to the navigation screen.

Figure 6:
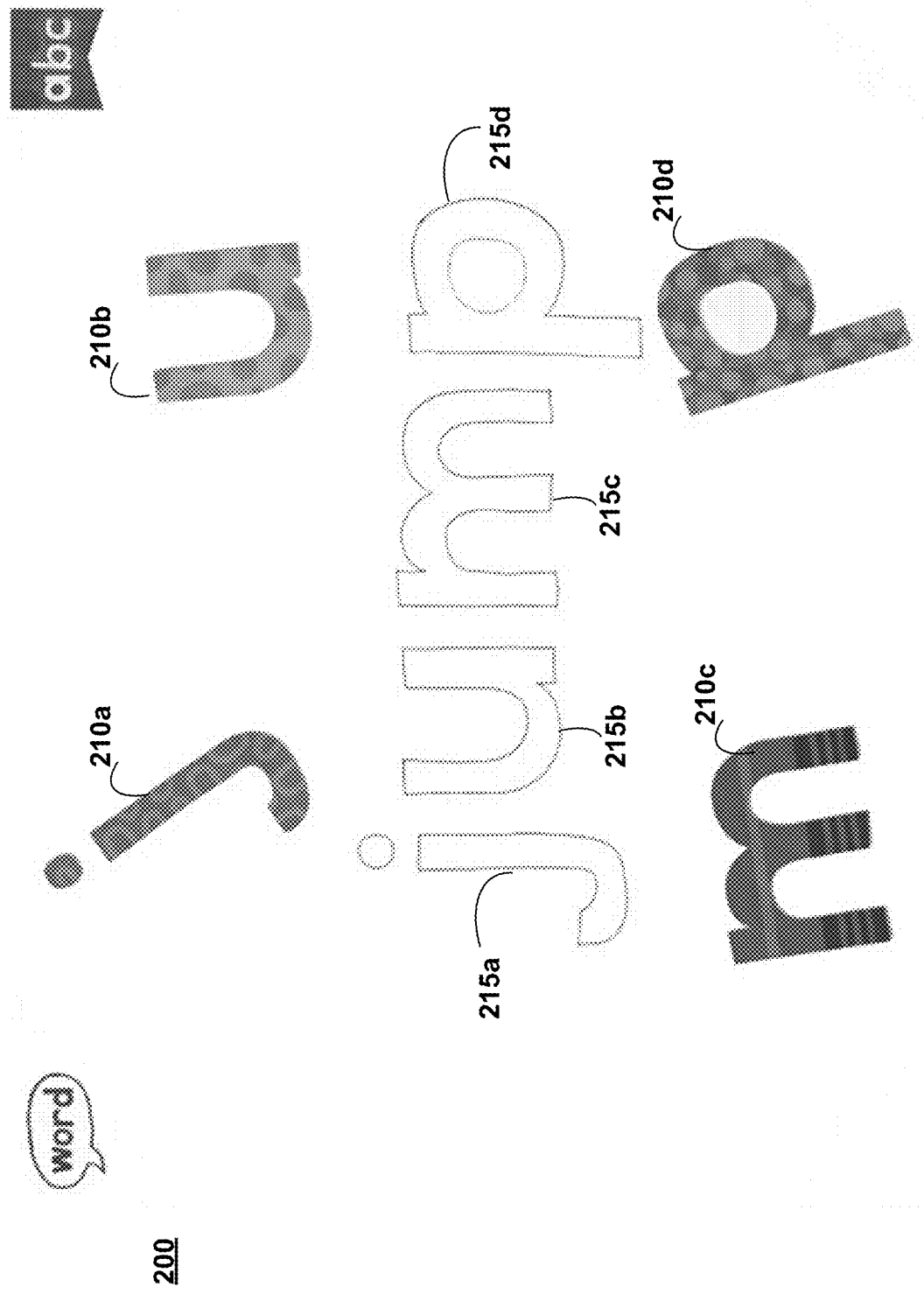
FIG. 6 is a screenshot of an example incomplete word puzzle for a selected word as may be implemented in some embodiments.

FIG. 6 is a screenshot of an example incomplete word puzzle 600 for a selected word as may be implemented in some embodiments. The letter pieces 610*a-d* of the puzzle are randomly strewn (e.g., random rotations and translations, or evenly separated around the screen) on the play screen and the target puzzle slots 615*a-d* for each of the letters are shown as outlines. In an alternative embodiment, the specific puzzle slots may not be presented to the user, and the puzzle may be a number or numerical equation.

Attention is called to the "word" navigational icon in the upper left of the screen which may trigger the read back of the target word at any time during play and the "abc" navigational icon in the upper right of the screen which may return the user to the primary navigational interface.

Figure 7:
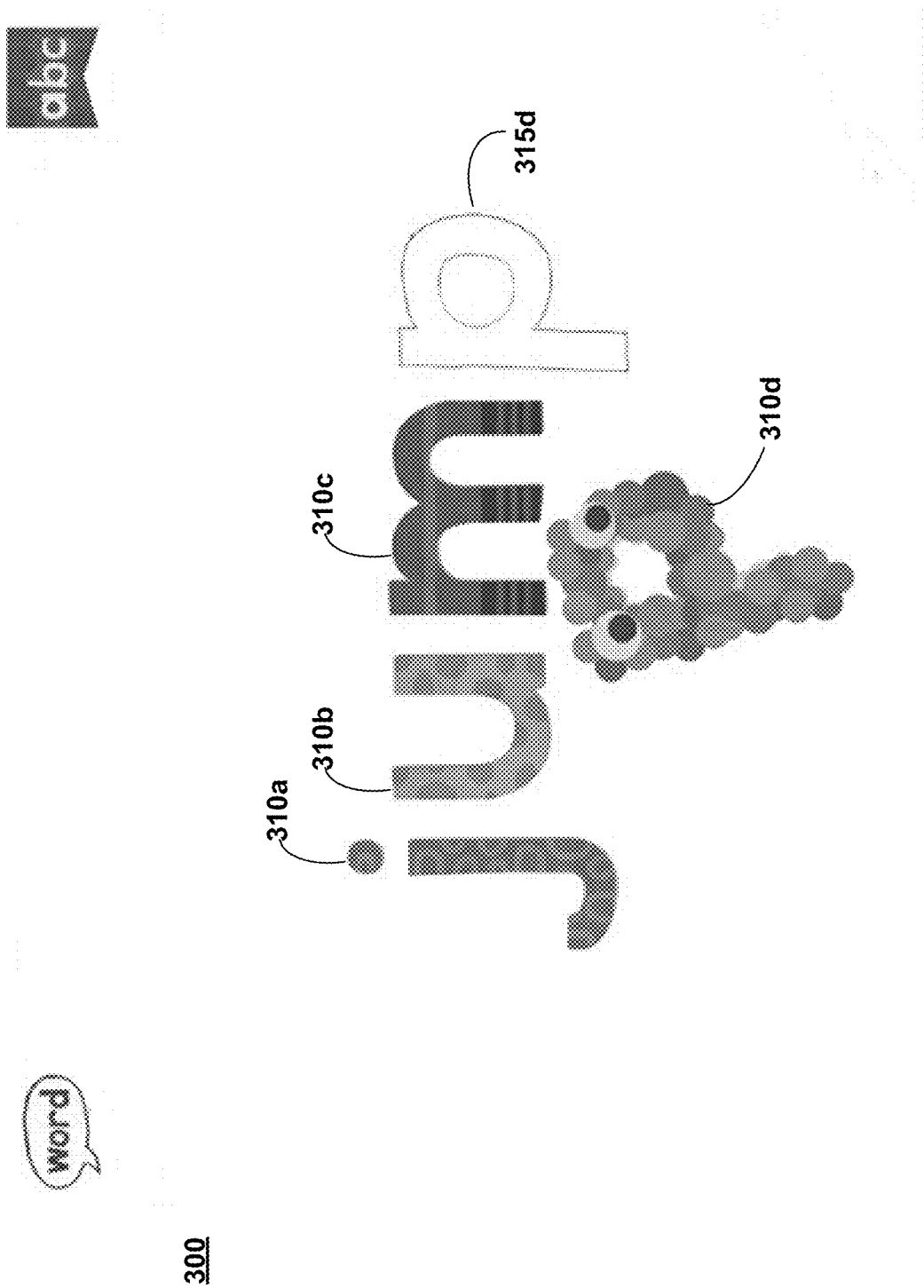
FIG. 7 is a screenshot of a partially completed example word puzzle with the letter "p" actively selected (e.g., touched on a tablet device) in this example as may be implemented in some embodiments.

FIG. 7 is a screenshot of a partially completed example word puzzle 700 with the letter "p" 710*d* actively selected (e.g., touched on a tablet device). While actively selected (in this example through the user's touch on a tablet device), the letter "p" 710*d* takes on a form different than its static representation, and persistently animates and makes the phonetic sound of the letter. For example, eyes and/or a mouth may be overlaid on the letter to imply its "animal-like" character when selected. The real-time, multi-sensory feedback (audio and visual) facilitates improved memorization by the user. When the incorrect letter piece is put into a puzzle slot, the letter may be rejected from the slot and an audible rejection sound may be played.

In some embodiments, the reading of the incomplete word may be played as the puzzle is completed (but before final completion) to provide real-time feedback on the components of the puzzle that have been completed and what still needs to be done. By way of example, after the letters "j-u-m-" 710*a-c* are seated in the word puzzle for "jump", there may be an audible reading of "jum-" noting which letters are in place. This may imply that the letter "p" 710*d* still needs to be placed in slot 715*d* to complete the word.

Figure 8:
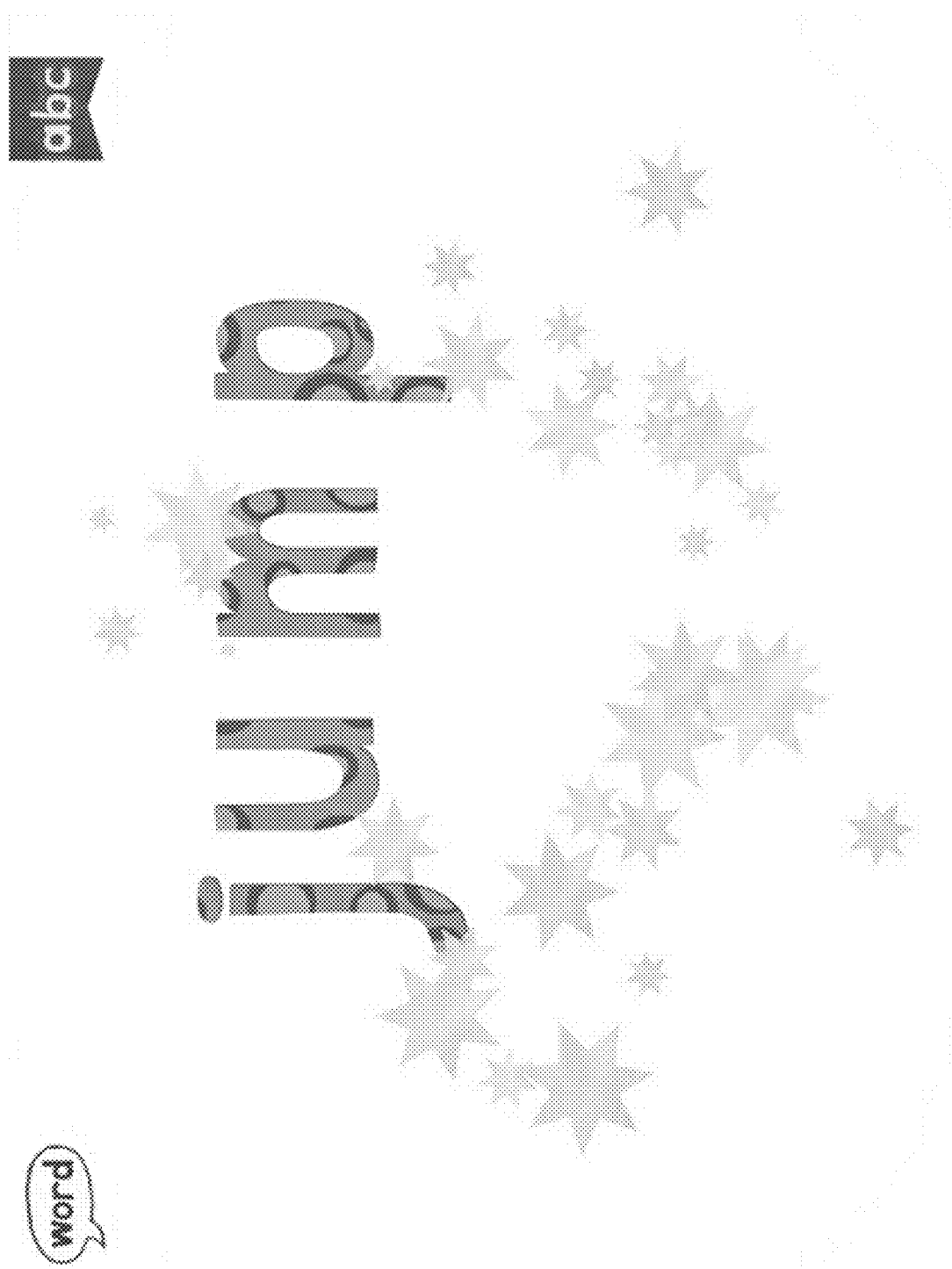
FIG. 8 is a screenshot of a celebration display as may be presented after a word puzzle is completed as may be implemented in some embodiments.

FIG. 8 is a screenshot of a celebration display 800 as may be presented after a word puzzle is completed as may be implemented in some embodiments. For example, stars and/or party streamers and balloons may traverse the screen as the letters are playfully jostled within a threshold distance of their correct position. As part of the celebration, an audible reading of the word may be played. In some embodiments, the definition of the word can also be read aloud following completion (e.g., in a different language than that in which the word occurs).

Figure 9:
FIG. 9 is a screenshot of an example incomplete sentence puzzle that includes the target word "jump" as may be implemented in some embodiments.

FIG. 9 is a screenshot of an example incomplete sentence puzzle 900 that includes the target word "jump" as may be implemented in some embodiments. This embodiment may be a continuation of the user flow shown in the screenshots of FIGS. 4-8. As indicated, the words "jump", "in", and "all" have been translated and rotated relative to their puzzle slot locations in the sentence. As with the letter example above, the rotation of the words may be only for visual effect. That is, the user need not rotate the word to insert it into the puzzle slot-selection may itself rotate the word to its correct angle or placement of the word in the puzzle slot may result in the proper rotation.

In some embodiments, the puzzle may instead be a numerical equation with numbers and/or binary operators as puzzle pieces that need to be placed. As parts of a numerical equation are completed, the component parts of the equation might be read back or the completed portions of the equation might be solved. Alternatively or additionally, the puzzle may be a chemical formula to aid in learning of various molecules.

Attention is called to the "sentence" navigational icon in the upper left of the screen which may trigger the read back of the target sentence at any time during play and the "abc" navigational icon in the upper right of the screen which may return the user to the primary navigational interface.

Figure 10:
FIG. 10 is a screenshot of a partially completed sentence puzzle with the word "jump" actively selected (e.g., touched on a tablet device) as may be implemented in some embodiments.

FIG. 10 is a screenshot of a partially completed sentence puzzle with the word "jump" actively selected (e.g., touched on a tablet device or a mouse key pressed while a cursor is over the word) as may be implemented in some embodiments. While actively engaged (in this case through the user's touch on a tablet device), the word "jump" takes on a form different than its static representation, and persistently animates (in this case, animating to jump up and down while the system simultaneously reads back the word pronunciation). Accordingly, in a manner similar to the letter example above, FIG. 10 again illustrates the real-time, multi-sensory feedback approach to learning. Not all words need be given "animal-like attributes" when providing feedback. For example, the verb "jump" is here performing a jump to illustrate its real-world correspondence without being modified to resemble an animal.

When the incorrect word piece is put into a puzzle slot, the word may be rejected from the slot and an audible rejection sound may be played and accompanying animation of the word or sentence performed. In some embodiments, the reading of the incomplete sentence may be played as the puzzle is partially completed (but before final completion) to provide real-time feedback on the partially completed puzzle components. For example, after placing "in" following placement of "all" in FIG. 10 the system may recite "Rocky loves to <substitute sound> in all kinds of ways", where the "<substitute sound>" is a bell ding, swoosh, or other clip (or simply silence) used to signify an omission in the completed sentence.

Figure 11:
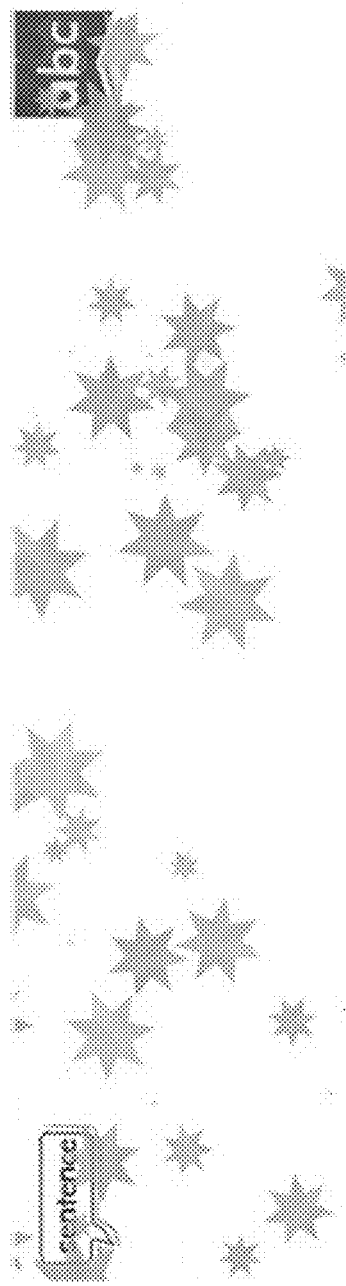
FIG. 11 is a screenshot of a celebration display as may be presented after a sentence puzzle is completed in some embodiments.

FIG. 11 is a screenshot of a celebration display 1100 as may be presented after a sentence puzzle is completed in some embodiments. The word "jump" may perform its action animation, while the other letters distort and/or jostle playfully. In some embodiments, the sentence can be read aloud, e.g., as part of the celebration sequence.

Figure 12:
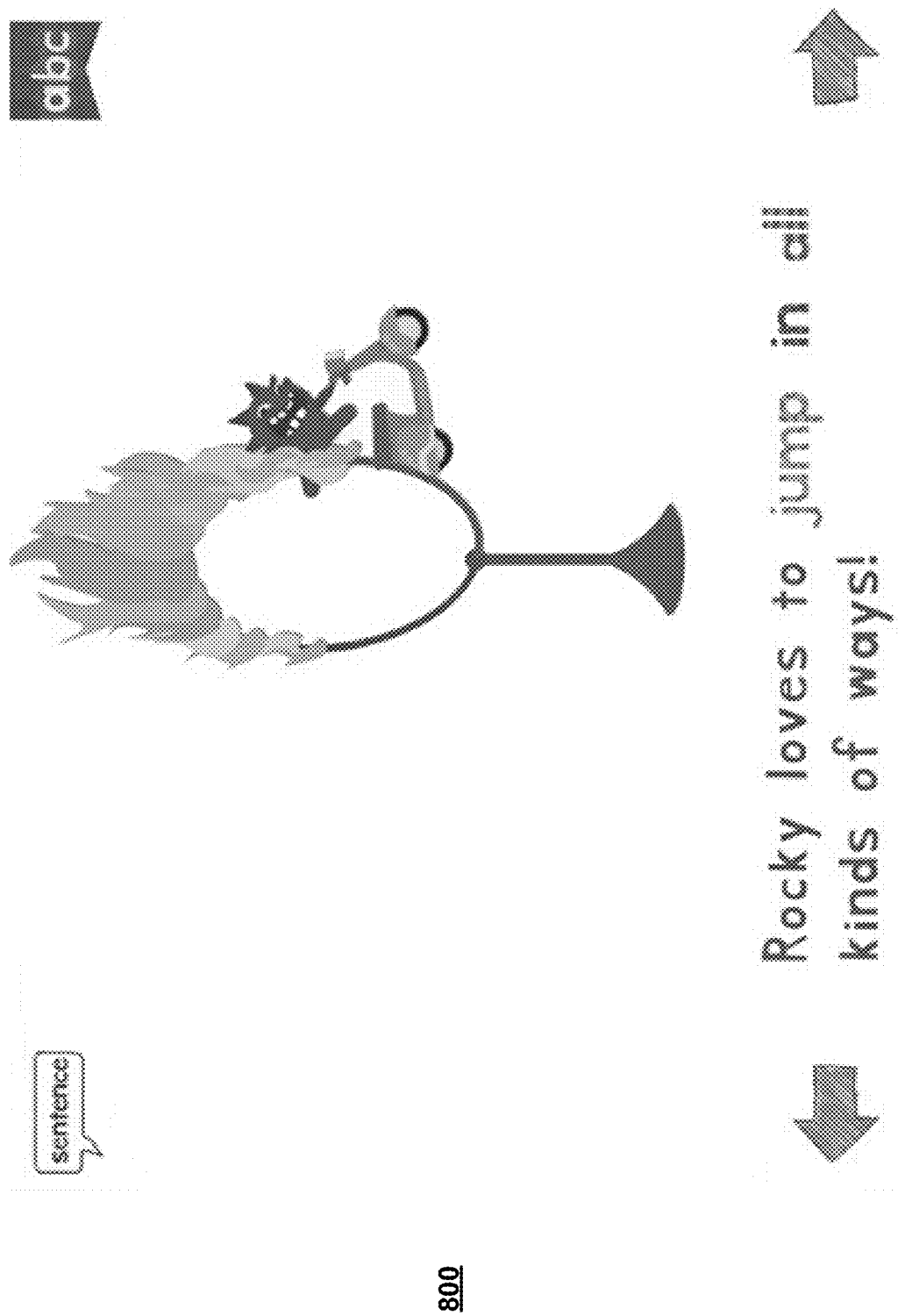
FIG. 12 is a screenshot of a short animation that describes and reinforces the use of the target word (e.g., "jump") as may be implemented in some embodiments.

FIG. 12 is a screenshot of a short animation that describes and reinforces the use of the target word (e.g., "jump") as may be implemented in some embodiments. FIG. 12 may continue the flow of FIGS. 4-11. In this example, the short animation is an animated vignette capturing the use and context of the word or sentence, particularly the Rocky character jumping over or through an object.

Computer System

FIG. 13 is a block diagram of a computer system as may be used to implement features of some of the embodiments. The computer system may be a server computer, a client computer, a personal computer (PC), a user device, a tablet PC, a laptop computer, a personal digital assistant (PDA), a cellular telephone, an iPhone, an iPad, a Blackberry, a processor, a telephone, a web appliance, a network router, switch or bridge, a console, a hand-held console, a (hand-held) gaming device, a music player, any portable, mobile, hand-held device, wearable device, or any machine capable of executing a set of instructions (sequential or otherwise) that specify actions to be taken by that machine.

The computing system 1300 may include one or more central processing units ("processors") 1305, memory 1310, input/output devices 1325 (e.g., keyboard and pointing devices, touch devices, display devices), storage devices 1320 (e.g., disk drives), and network adapters 1330 (e.g., network interfaces) that are connected to an interconnect 1315. The interconnect 1315 is illustrated as an abstraction that represents any one or more separate physical buses, point to point connections, or both connected by appropriate bridges, adapters, or controllers. The interconnect 1315, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Engineers (IEEE) standard 1394 bus, also called "Firewire".

The memory 1310 and storage devices 1320 are computer-readable storage media that may store instructions that implement at least portions of the various embodiments. In addition, the data structures and message structures may be stored or transmitted via a data transmission medium, e.g., a signal on a communications link. Various communications links may be used, e.g., the Internet, a local area network, a wide area network, or a point-to-point dial-up connection. Thus, computer readable media can include computer-readable storage media (e.g., "non-transitory" media) and computer-readable transmission media.

The instructions stored in memory 1310 can be implemented as software and/or firmware to program the processor(s) 1305 to carry out actions described above. In some embodiments, such software or firmware may be initially provided to the processing system 1300 by downloading it from a remote system through the computing system 1300 (e.g., via network adapter 1330).

The various embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in certain instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given above. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

What is claimed is:

1. A computer-implemented method for providing, on a user computer, a virtual puzzle comprising a plurality of virtual puzzle pieces placeable in corresponding puzzle slots to collectively form a target;
   wherein either: each of the plurality of virtual puzzle pieces comprises at least one letter, and the target comprises a target word; or, the plurality of virtual puzzle pieces comprises a plurality of words, and the target comprises a sentence;
   wherein the user computer comprises a display screen, an audio transducer, and an input device;
   the method comprising the steps of:
   (a) displaying, on the display screen, the plurality of virtual puzzle pieces displaced from their corresponding puzzle slots, wherein the plurality of virtual puzzle pieces are movable on the display screen with use of the input device; and
   (b) in response to the input device selecting any one of the plurality of virtual puzzle pieces while the selected virtual puzzle piece is displaced from its corresponding puzzle slot, causing the user computer to generate in real-time a selection sensory feedback comprising:
      the display screen persistently displaying an animation of the selected virtual puzzle piece while the input device is moving the selected virtual puzzle piece and the selected virtual puzzle piece is displaced from its corresponding puzzle slot; and
      the audio transducer outputting a vocalization of the selected virtual puzzle piece, wherein the vocalization is mapped by a database to the selected virtual puzzle piece, and
      wherein the vocalization comprises either: a phonetic sound of the selected virtual puzzle piece when the selected puzzle piece comprises at least one letter and the target comprises the target word; or a pronunciation of the selected virtual puzzle piece when the selected puzzle piece comprises one of the plurality of words and the target comprises the sentence.

2. The method of claim 1, wherein each of the plurality of virtual puzzle pieces comprises at least one letter, the target comprises the target word, and the vocalization comprises the phonetic sound of the selected virtual puzzle piece.

3. The method of claim 2, wherein the phonetic sound of the selected virtual puzzle piece depends on the target word.

4. The method of claim 1, wherein the plurality of virtual puzzle pieces comprises the plurality of words, the target comprises the sentence, and the vocalization comprises the reading of the selected virtual puzzle piece.

5. The method of claim 1, wherein the animation persists while the selected virtual puzzle piece is selected by the input device.

6. The method of claim 1, wherein the animation illustrates an action described by the selected virtual puzzle piece.

7. The method of claim 1, wherein the method further comprises the step of:
   (c) in response to the input device incorrectly placing any one of the plurality of virtual puzzle pieces in one of the puzzle slots corresponding to another one of the plurality of virtual puzzle pieces, causing the user computer to generate in real-time a rejection sensory feedback comprising one or a combination of: the audio transducer outputting a rejection sound; and the display screen displaying a rejection animation.

8. The method of claim 1, wherein the method further comprises the step of:
   (c) in response to the input device correctly placing any one of the plurality of virtual puzzle pieces in its corresponding puzzle slot to partially complete the target, causing the user computer to generate in real-time a partial success sensory feedback comprising: the audio transducer outputting a vocalization of the partially completed target.

9. The method of claim 8, wherein the vocalization of the partially completed target comprises a sound substituted for one of the plurality of virtual puzzle pieces omitted from the partially completed target.

10. The method of claim 1, wherein the method further comprises the step of:
    (c) in response to the input device correctly placing any one of the plurality of virtual puzzle pieces in its corresponding puzzle slot to complete the target, causing the user computer to generate in real-time a readback sensory feedback comprising: the audio transducer outputting a vocalization of the completed target.

11. The method of claim 10, wherein the readback sensory feedback further comprises the display screen displaying a completion animation that illustrates an action described by the target.

12. The method of claim 1, wherein the method further comprises the step of the display screen displaying graphical indicators for the puzzle slots.

13. The method of claim 1, wherein in step (b), the input device selecting any one of the plurality of virtual puzzle pieces comprises positioning, on the display screen, a cursor controlled by a computer mouse of the user computer, before a button of the computer mouse is depressed to drag the one of the plurality of virtual puzzle pieces on the display screen.

14. A non-transitory computer-readable medium storing instructions executable by at least one processor, to implement a method for providing, on a user computer, a virtual puzzle comprising a plurality of virtual puzzle pieces placeable in corresponding puzzle slots to collectively form a target;

wherein either: each of the plurality of virtual puzzle pieces comprises at least one letter, and the target comprises a target word; or, the plurality of virtual puzzle pieces comprises a plurality of words, and the target comprises a sentence; and wherein the user computer comprises a display screen, an audio transducer, and an input device;

wherein the method comprises the steps of:

(a) displaying, on the display screen, the plurality of virtual puzzle pieces displaced from their corresponding puzzle slots, wherein the plurality of virtual puzzle pieces are movable on the display screen with use of the input device; and (b) in response to the input device selecting any one of the plurality of virtual puzzle pieces while the selected virtual puzzle piece is displaced from its corresponding puzzle slot, causing the user computer to generate in real-time a selection sensory feedback comprising:

the display screen persistently displaying an animation of the selected virtual puzzle piece while the input device is moving the selected virtual puzzle piece and the selected virtual puzzle piece is displaced from its corresponding puzzle slot; and the audio transducer outputting a vocalization of the selected virtual puzzle piece, wherein the vocalization is mapped by a database to the selected virtual puzzle piece; and wherein the vocalization comprises either: a phonetic sound of the selected virtual puzzle piece when the selected puzzle piece comprises at least one letter and the target comprises the target word; or a pronunciation of the selected virtual puzzle piece when the selected puzzle piece comprises one of the plurality of words and the target comprises the sentence.

15. The non-transitory computer-readable medium of claim 14, wherein each of the plurality of virtual puzzle pieces comprises at least one letter, the target comprises the target word, and the vocalization comprises the phonetic sound of the selected virtual puzzle piece.

16. The non-transitory computer-readable medium of claim 15, wherein the phonetic sound of the selected virtual puzzle piece depends on the target word.

17. The non-transitory computer-readable medium of claim 14, wherein the plurality of virtual puzzle pieces comprises the plurality of words, the target comprises the sentence, and the vocalization comprises the reading of the selected virtual puzzle piece.

18. The non-transitory computer-readable medium of claim 14, wherein the animation persists while the selected virtual puzzle piece is selected by the input device.

19. The non-transitory computer-readable medium of claim 14, wherein the animation illustrates an action described by the selected virtual puzzle piece.

20. The non-transitory computer-readable medium of claim 14, wherein the method further comprises the step of:

(c) in response to the input device incorrectly placing any one of the plurality of virtual puzzle pieces in one of the puzzle slots corresponding to another one of the plurality of virtual puzzle pieces, causing the user computer to generate in real-time a rejection sensory feedback comprising one or a combination of: the audio transducer outputting a rejection sound; and the display screen displaying a rejection animation.

21. The non-transitory computer-readable medium of claim 14, wherein the method further comprises the step of:

(c) in response to the input device correctly placing any one of the plurality of virtual puzzle pieces in its corresponding puzzle slot to partially complete the target, causing the user computer to generate in real-time a partial success sensory feedback comprising: the audio transducer outputting a vocalization of the partially completed target.

22. The non-transitory computer-readable medium of claim 21, wherein the vocalization of the partially completed target comprises a sound substituted for one of the plurality of virtual puzzle pieces omitted from the partially completed target.

23. The non-transitory computer-readable medium of claim 14, wherein the method further comprises the step of:

(c) in response to the input device correctly placing any one of the plurality of virtual puzzle pieces in its corresponding puzzle slot to complete the target, causing the user computer to generate in real-time a readback sensory feedback comprising: the audio transducer outputting a vocalization of the completed target.

24. The non-transitory computer-readable medium of claim 14, wherein in step (b), the input device selecting any one of the plurality of virtual puzzle pieces comprises positioning, on the display screen, a cursor controlled by a computer mouse of the user computer, before a button of the computer mouse is depressed to drag the one of the plurality of virtual puzzle pieces on the display screen.

* * * * *